US012794770B2

(12) United States Patent
Koundinya

(10) Patent No.: US 12,794,770 B2
(45) Date of Patent: Nov. 10, 2026

(54) EFFICIENT SPLIT MANAGEMENT IN A VIRTUAL SWITCH USING A SPANNING TREE

(71) Applicant: HEWLETT PACKARD ENTERPRISE DEVELOPMENT LP, Spring, TX (US)

(72) Inventor: Chivukula Koundinya, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 172 days.

(21) Appl. No.: 18/887,219

(22) Filed: Sep. 17, 2024

(65) Prior Publication Data

US 2025/0392510 A1 Dec. 25, 2025

(30) Foreign Application Priority Data

Jun. 19, 2024 (IN) ............................. 202441047227

(51) Int. Cl.

*H04L 41/0816* (2022.01)
*H04L 45/48* (2022.01)
*H04L 45/58* (2022.01)
*H04L 49/00* (2022.01)

(52) U.S. Cl.

CPC .......... *H04L 41/0816* (2013.01); *H04L 45/48* (2013.01); *H04L 45/583* (2013.01); *H04L 49/70* (2013.01)

(58) Field of Classification Search

CPC ... H04L 41/0816; H04L 45/48; H04L 45/583; H04L 49/70

See application file for complete search history.

(56) References Cited

U.S. PATENT DOCUMENTS 7,209,435 B1 * 4/2007 Kuo .................... H04L 43/0876 370/242
8,990,430 B2 * 3/2015 Smith ................... H04L 45/583 709/249
10,992,515 B1 * 4/2021 Ranjit ..................... H04L 41/06
12,477,042 B1 * 11/2025 Radulescu-Banu .......................... H04L 45/308

(Continued)

OTHER PUBLICATIONS

HBC, "02-IRF Configuration Guide", available online at <https://www.h3ccom/en/d_202001/1265381_294551_0.htm>, retrieved from internet on Oct. 7, 2024, 57 pages.

*Primary Examiner* — Mohamed A. Wasel

(74) *Attorney, Agent, or Firm* — Yao Legal Services, Inc.

(57) ABSTRACT

A network device of a virtual switch, which includes a second network device and operates on a unified control plane, is provided. During operation, the network device maintains a link between its first port and a second port of the second network device. Here, the first link can be distinct from a second link used for exchanging data traffic of the virtual switch. The network device operates a spanning tree protocol to place the first and second ports in respective port states, which include a forwarding state and a blocked state. If the second link becomes unavailable, the network device determines that the virtual switch has split into a first segment comprising the network device and a second segment comprising the second network device. If the first port state is in the blocked state, the network device suspends communication via a respective port of the first segment.

20 Claims, 8 Drawing Sheets

(56) References Cited

U.S. PATENT DOCUMENTS

| | | | | |
|---|---|---|---|---|
| 2010/0312943 | A1* | 12/2010 | Uehara | G06F 13/387<br>710/316 |
| 2014/0247754 | A1* | 9/2014 | Venkata | H04L 45/48<br>370/256 |
| 2022/0045988 | A1* | 2/2022 | Lo | H04L 63/20 |
| 2022/0337512 | A1* | 10/2022 | Hu | H04L 45/48 |

* cited by examiner

EFFICIENT SPLIT MANAGEMENT IN A VIRTUAL SWITCH USING A SPANNING TREE

BACKGROUND

A network device, such as a switch, may support different protocols and services. For example, the network device can support virtual switch stacking. The network device can then be deployed in a network that can operate as a virtual switch, which can facilitate a unified control plane across the network.

BRIEF DESCRIPTION OF THE FIGURES

In the figures, like reference numerals refer to the same figure elements.

DETAILED DESCRIPTION

Figure 1:
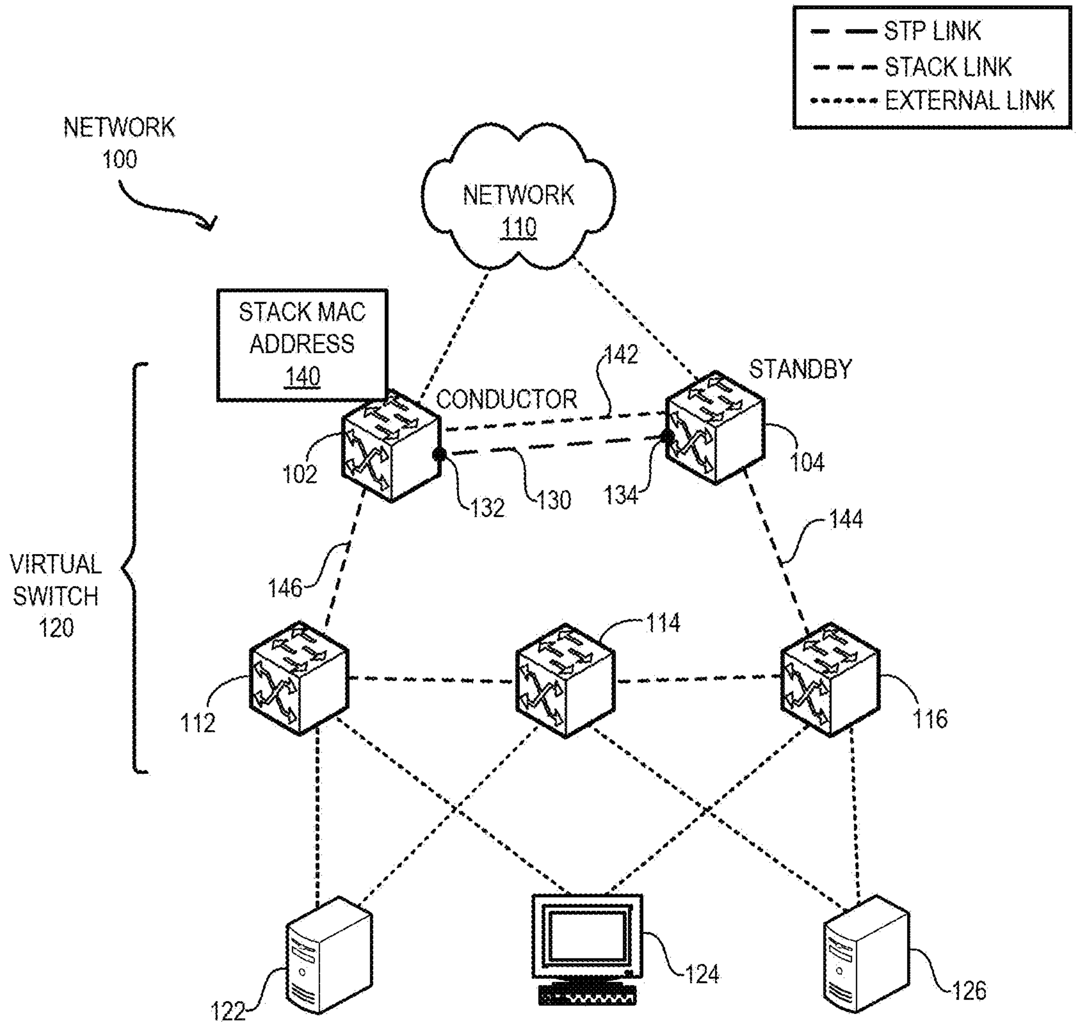
FIG. 1 illustrates an example of a virtual switch supporting efficient split management, in accordance with an aspect of the present application.

The volume of traffic generated by various applications on user devices continues to increase. To efficiently forward and manage the traffic in a network, the network devices can be equipped with versatile capabilities, such as scalable high availability. Each of these network devices can include at least one processing resource and a non-transitory storage medium. For example, the network should be able to accommodate traffic from an increasing number of user devices even during a failure scenario. Network virtualization technologies, such as switch stacking, can facilitate scalable bandwidth and high availability. Switch stacking can allow a plurality of inter-connected network devices to operate as a virtual switch with a unified control plane. An example of a virtual switch can be a virtual switch framework (VSF) stack.

The unified control plane can be a single control plane shared among the network devices of the virtual switch. Different network devices of the virtual switch can be assigned different roles. When a network device is assigned a role, the network device may require performing a particular set of operations. For example, a conductor network device (or conductor device) can be tasked to maintain the control plane information (e.g., by running the protocols of the control plane) on behalf of the virtual switch. A standby network device (or standby device) can operate as a backup conductor device that can facilitate high availability to the conductor device. The rest of the network devices can be member network devices (or member devices).

A respective network device pair of the virtual switch can be coupled to each other through a dedicated point-to-point (e.g., copper or fiber) link, which can be referred to as a stack link. Typically, the stack links couple the network devices of the virtual switch in a ring or chain topology. The stack links can carry the data and control traffic of the virtual switch. The virtual switch can present a stack media access control (MAC) address to external devices. The conductor device can be responsible for external communications based on the stack MAC address. As a result, the virtual switch may appear as a single logical switch to these external devices. Since the stack MAC address can be allocated to the conductor device, the conductor device can receive traffic based on the stack MAC address from external devices and distribute it among the network devices of the virtual switch.

The aspects described herein address the problem of efficiently selecting an active segment of a split virtual switch by (i) operating a spanning tree protocol (STP) instance on a dedicated non-stack link between the conductor and the standby devices of the virtual switch; and (ii) upon detecting a split in the virtual switch, selecting the segment with the forwarding state of the STP instance as the active segment. The link on which the STP instance is running can be referred to as the STP link, which is distinct from a stack link. The port of the STP link on the conductor device can be allocated a forwarding state, and the port on the standby device can be allocated a blocked state. If the virtual switch splits into multiple stack segments, the conductor device can, based on the forwarding state, select its segment as the active segment and continue to operate with the virtual MAC address. On the other hand, the standby device can, based on the blocked state, suspend operations of a respective port of its segment and prevent the use of the virtual MAC address.

Currently, the conductor device and the standby device can be reachable to each other via at least two links in a ring topology. As a result, even if one of such links is unavailable, the conductor device can communicate with the standby device and, hence, does not trigger a failover. However, if all links between the conductor device and the standby device are disconnected, the standby device becomes disconnected from the conductor device. Consequently, the standby device may determine that the conductor device has become unavailable and can start operating as a new conductor device for the virtual switch and become associated with the stack MAC address. Therefore, there can be two conductor devices associated with the same stack MAC address. In this way, the virtual switch can be split into at least two segments, each with a conductor device.

When the virtual switch is split, both conductors can send and receive traffic to external devices based on the stack MAC address. For example, two source external devices can be coupled with two segments. When these external devices send packets to a destination external device via their respective segments, both segments can use the stack MAC address as the source address of the layer-2 header while forwarding the packets to the destination external device. Consequently, the destination external devices can observe the stack MAC address from both segments (i.e., from both the previous and new conductor devices). As a result, the destination external devices may determine that the stack MAC address has been repeatedly migrating between the two segments. Such repeated MAC address movement can disrupt layer-2 forwarding.

To address this problem, an additional STP link, which can be distinct from the stack links, can be maintained between the conductor device and the standby device. An STP instance can execute on the ports coupled to this STP link. Typically, the network devices of the virtual switch are coupled to each other in a ring or chain topology. As a result, the STP link can create a loop among the network devices of the virtual switch. Consequently, the STP instance can block one of the ports of the STP link to terminate the loop by placing the port in a blocked state. Accordingly, the STP instance can maintain a forwarding state for the port on the conductor device and a blocked state for the port on the standby device. In some examples, the port on the conductor device can be allocated (e.g., by an administrator) a higher priority value than the port on the standby device for the STP instance. As a result, the port of the conductor device can be allocated with the forwarding state.

If the virtual switch is split, the standby device can determine that the conductor device has become unavailable. For example, there can be one or more link failures that can disconnect the standby device from the conductor device. Consequently, the standby device cannot verify the operational status of the conductor device and may determine that the conductor device has become unavailable. Hence, the standby device can start operating as a new conductor device. On the other hand, the original conductor device can also determine that the standby device has become unavailable. In this way, both conductor devices may detect the split in the virtual switch. Upon detecting the split, the conductor devices can determine which segment of the virtual switch is to operate as the active segment that is to forward traffic associated with the stack MAC address. To select the active segment, a respective conductor device can determine the local port state of the STP link on the conductor device. The conductor device with the blocked port state can determine that it is the new and duplicate conductor device. Accordingly, the duplicate conductor device can deactivate its segment into a suspended state by turning off communication via a respective port of the segment. Because the stack MAC address is not used by the suspended segment, the external devices may not observe the movement of the stack MAC address.

Furthermore, if the conductor device becomes unavailable, the STP instance of the standby device can detect the unavailability of the conductor device via the STP link. If the STP link directly couples the standby device with the conductor device, the STP instance can transition the port of the standby device from the blocked state to a down state (i.e., indicating the unavailability of the STP link). On the other hand, if the STP link couples the standby device with the conductor device via multiple layer-2 hops (e.g., devices and links), the STP instance can transition the port of the standby device from the blocked state to a forwarding state. In either topology, the port of the standby device may no longer be in the blocked state when the conductor device becomes unavailable.

In addition, a respective stack link coupling the conductor device can become unavailable due to the unavailability of the conductor device. Therefore, the conductor device can become disconnected from the standby device. Accordingly, the standby device can start operating as a new conductor device. Since the port of the new conductor device is no longer in a blocked state, the new conductor device can determine that its segment should be the active segment. Consequently, the new conductor device can be associated with the stack MAC address and start forwarding traffic. In this way, the STP link can ensure that the standby device can facilitate high availability to the conductor device without being associated with the stack MAC address in the event of a split in the virtual switch.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a virtual switch supporting efficient split management, in accordance with an aspect of the present application. A network 100 can include a number of inter-connected network devices 102, 104, 112, 114, and 116. Network 100 may be coupled to a management device, which can manage network 100 and provision network devices 102, 104, 112, 114, and 116. Furthermore, the management device can allow a user (or administrator) to issue configuration instructions to any of these network devices. Network 100 can support switch stacking, which can allow network devices 102, 104, 112, 114, and 116, in conjunction with each other, to operate as a virtual switch 120 with a unified control plane. An example of virtual switch 120 can be a VSF stack. A respective network device in virtual switch 120 can include at least one processing resource. Examples of a processing resource can include, but are not limited to, a processor core, a graphics processing unit (GPU), and a tensor processing unit (TPU). External user devices 122, 124, and 126 can be coupled to network devices 112, 114, and 116.

The unified control plane can be a single control plane shared among network devices 102, 104, 112, 114, and 116. To facilitate the control and operations of virtual switch 120, different network devices of virtual switch 120 are configured with different roles. In virtual switch 120, network devices 102 and 104 can be configured with the roles of a conductor device and a standby device, respectively. Standby device 104 can operate as a backup conductor device that can facilitate high availability to conductor device 102. The rest of the devices of network 100 can be configured with the role of a member device. A member device may not run a routing protocol and maintain its states indicating the routers and path costs to network 110. Furthermore, conductor device 102 can be responsible for determining routes outside of virtual switch 120. The ports of a member device can be controlled and programmed by conductor device 102. Conductor device 102 and standby device 104 can be coupled to an external network 110 to facilitate communication with external devices 122, 124, and 126.

Conductor device 102 can maintain the control plane operations of virtual switch 120 while standby device 104 operates as a backup for facilitating high availability to conductor device 102. Conductor device 102 can also control a respective line card, including the ones in network devices 102, 104, 112, 114, and 116, in virtual switch 120. Conductor device 102 can run control plane daemons, such as routing and management protocol daemons, and propagate the resultant control information, such as a new route, to other network devices of virtual switch 120. The control plane traffic allows virtual switch 120 to maintain its topology and states for operating as a single logical switch. Conductor device 102 can be assigned a control IP address, which allows other network devices to obtain control information. Such control information can include routing and forwarding information associated with virtual switch 120.

The network devices in virtual switch 120 can be coupled to each other via stack links (e.g., point-to-point copper- or fiber-based Ethernet links). Typically, the stack links couple the network devices of virtual switch 120 in a ring or chain topology. The network devices in virtual switch 120 can use the stack links to forward data plane traffic and exchange control plane traffic. Virtual switch 120 can present stack MAC address 140 to external devices 122, 124, and 126. Conductor device 102 can be responsible for external communications based on stack MAC address 140. As a result, to external devices 122, 124, and 126, virtual switch 120 may appear as a single logical switch. Since stack MAC address 140 can be allocated to conductor device 102, conductor device 102 can receive traffic based on stack MAC address 140 from external devices and distribute it among the network devices of the virtual switch.

A respective packet on a stack link can be encapsulated with a stack encapsulation header associated with virtual switch 120. For example, conductor device 102 can receive a packet destined to external device 126 from network 110 based on stack MAC address 140. Based on the control plane, conductor device 102 can determine that device 126 is reachable via network device 114. Conductor device 102 can then encapsulate the packet with a stack encapsulation header and forward the encapsulated packet to network device 114. The source and destination addresses of the stack encapsulation header can correspond to conductor device 102 and network device 114, respectively. Accordingly, when network device 114 receives the encapsulated packet, network device 114 can decapsulate the stack encapsulation header and forward the Ethernet packet to device 126.

In this example, network devices 102, 104, 112, 114, and 116 can be in a ring topology. Therefore, conductor device 102 and standby device 104 can be reachable to each other via links 142 and 144. As a result, even if one of links 142 and 144 is unavailable, conductor device 102 can still communicate with standby device 104. However, if both links 142 and 144 are disconnected, standby device 104 becomes disconnected from conductor device 102. Consequently, standby device 104 may determine that conductor device 102 has become unavailable and can start operating as a new conductor device (i.e., conductor device 104) for virtual switch 120. Conductor device 104 can then become associated with stack MAC address 140. Therefore, conductor devices 102 and 104 can be associated with the same stack MAC address 140. In this way, virtual switch 120 can be split into at least two segments, each with a conductor device. As a result, conductor devices 102 and 104 can receive packets based on stack MAC address 140 and forward them to external devices 122, 124, and 126. Consequently, these external devices may detect repeated movement of stack MAC address 140.

To address this problem, an additional STP link 130, which can be distinct from the stack links, such as links 142 and 144, can be maintained between conductor device 102 and standby device 104. STP link 130 can be a direct link or span across one or more layer-2 hops (e.g., links and devices) between conductor device 102 and standby device 104. An STP instance can run on ports 132 and 134 coupled to STP link 130. Because the network devices in network 100 are in a ring topology, the STP instance can detect a loop within virtual switch 120. By detecting the loop, the STP instance can place port 132 on conductor device 102 in a forwarding state and port 134 on standby device 134 in a blocked state. In some examples, port 132 can be allocated a higher priority value than port 134 for the STP instance. An administrator may configure the priority values at ports 132 and 134. As a result, the STP instance can place port 132 in the forwarding state based on the priority values.

If virtual switch 120 becomes split, standby device 104 can start operating as a conductor device (e.g., conductor device 104). Conductor devices 102 and 104 can then check the states of ports 132 and 134, respectively. Conductor device 102 can determine that its port 132 is in the forwarding state. Hence, conductor device 102 can select its segment as the active segment and continue data communication based on stack MAC address 140. On the other hand, conductor device 104 can determine that port 134 is in the blocked state. Accordingly, conductor device 104 can deactivate its segment into a suspended state by suspending (i.e., turning off) communication via a respective port of the segment. Because the stack MAC address is not used by conductor device 104, the external devices would not observe a movement of stack MAC address 140. In this way, an active segment can be efficiently selected if virtual switch 120 splits.

Furthermore, if conductor device 102 becomes unavailable, the STP instance of standby device 104 can detect the unavailability of conductor device 102 via STP link 130. If STP link 130 directly couples standby device 104 with conductor device 102, the STP instance can determine that STP link 130 is unavailable since the other end (i.e., port 132) is unavailable. Therefore, port 134 can no longer send or receive data. Accordingly, the STP instance can transition port 134 from the blocked state to a down state indicating the unavailability of STP link 130. On the other hand, if STP link 130 couples standby device 104 with conductor device 102 via multiple layer-2 hops, the STP instance may determine that since port 132 is unavailable, there is no longer a loop caused by port 132. Therefore, the STP instance can transition port 134 from the blocked state to a forwarding state. In either topology, port 134 may no longer be in the blocked state when conductor device 102 becomes unavailable.

In addition, stack links 142 and 146 coupling conductor device 102 can become unavailable due to the unavailability of conductor device 102. Therefore, conductor device 102 can become disconnected from standby device 104. Accordingly, standby device 104 can start operating as a new conductor device (i.e., conductor device 104). Since port 134 is no longer in a blocked state, conductor device 104 can determine that its segment should be the active segment. Consequently, conductor device 104 can be associated with stack MAC address 140 and start forwarding traffic. In this way, STP link 130 can ensure that standby device 104 can facilitate high availability to conductor device 102 without being associated with stack MAC address 140 in the event of a split in virtual switch 120.

Figure 2A:
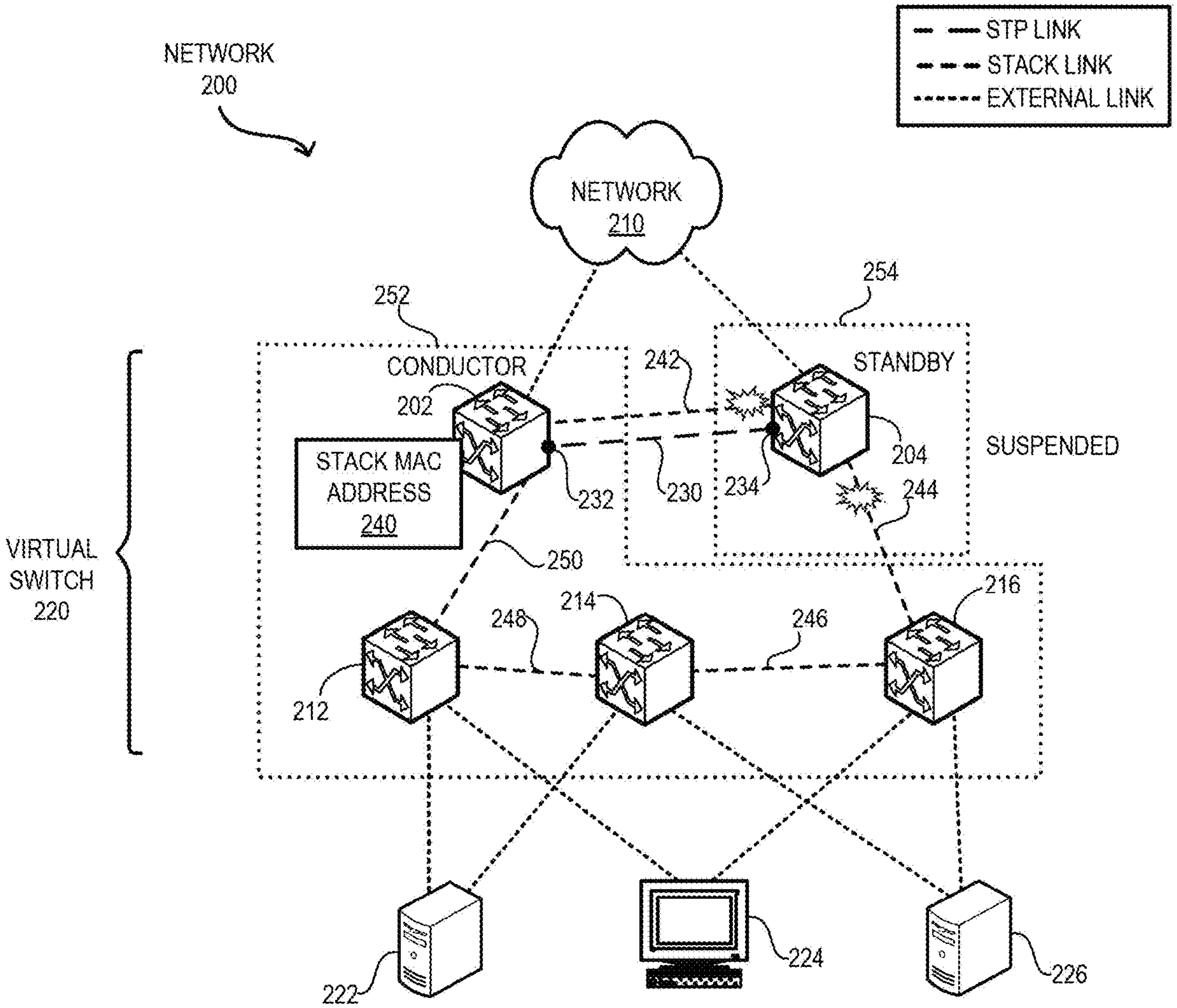
FIG. 2A illustrates an example of efficient split management in a virtual switch, in accordance with an aspect of the present application.

FIG. 2A illustrates an example of efficient split management in a virtual switch, in accordance with an aspect of the present application. A network 200 can include a number of inter-connected network devices 202, 204, 212, 214, and 216. Network 200 can support switch stacking, which can allow network devices 202, 204, 212, 214, and 216, in conjunction with each other, to operate as a virtual switch 220 (e.g., a VSF stack) with a unified control plane. An example of virtual switch 120 can be a VSF stack. External user devices 222, 224, and 226 can be coupled to network devices 212, 214, and 216. The unified control plane can be a single control plane shared among network devices 202, 204, 212, 214, and 216. A respective network device in virtual switch 220 can include one or more processing resources.

To facilitate the control and operations of virtual switch 120, different network devices of virtual switch 220 are configured with different roles. In virtual switch 220, network devices 202 and 204 can be configured with the roles of a conductor device and a standby device, respectively. Standby device 204 can operate as a backup conductor device that can facilitate high availability to conductor device 202. The rest of the devices of network 200 can be configured with the role of a member device. Conductor device 202 and standby device 204 can be coupled to an external network 210. Member devices 212, 214, and 216 can receive traffic from external devices 222, 224, and 226 and forward it to external network 210 via conductor device 202 and standby device 204. In this way, conductor device 202 and standby device 204 can facilitate external communication for external devices 222, 224, and 226.

Conductor device 202 can maintain the control plane operations of virtual switch 220 while standby device 204 operates as a backup for facilitating high availability to conductor device 202. Conductor device 202 can run control plane daemons, such as routing and management protocol daemons, and propagate the resultant control information, such as a new route, to other network devices of virtual switch 220. The control plane traffic generated by the control plane daemons (e.g., link-state packets generated by the routing daemon) allows virtual switch 220 to maintain its topology and states for operating as a single logical switch. The network devices in virtual switch 220 can be coupled to each other via stack links. Conductor device 202 can be responsible for external communications based on stack MAC address 240. As a result, to external devices 222, 224, and 226, virtual switch 220 may appear as a single logical switch.

To determine an active segment if virtual switch 220 splits, an STP link 230 can be maintained between conductor device 202 and standby device 204. An STP instance can execute on ports 232 and 234 coupled to STP link 230. If network devices 202, 204, 212, 214, and 216 are coupled to each other in a looped topology, such as a ring topology, STP link 230 is added to an existing loop. On the other hand, if these network devices are coupled to each other in a loop-free topology, such as a chain or tree topology, addition of STP link 230 can create a loop. In either case, STP link 230 can create a loop among the network devices of virtual switch 220. Consequently, the STP instance can block one of ports 232 and 234 to terminate the loop. Accordingly, the STP instance can maintain a forwarding state for port 232 on conductor device 202 and a blocked state for port 234 on standby device 204.

In network 200, conductor device 202 and standby device 204 can be reachable to each other via two paths of a ring topology. One of the paths can include link 242, and the other path can include links 244, 246, 248, and 250. As a result, when one of these links becomes unavailable, conductor device 202 can communicate with standby device 204. Here, standby device 204 may not consider conductor device 202 to be unavailable and hence, may not trigger a failover. However, if links 242 and 244 are unavailable (e.g., due to link failures), standby device 204 becomes disconnected from conductor device 202. Under such circumstances, virtual switch 220 can be split into segments 252 and 254. Segment 252 can include conductor device 202 and member devices 212, 214, and 216. On the other hand, segment 254 can include standby device 204.

When virtual switch 220 is split, standby device 204 can determine that conductor device 202 has become unavailable. Hence, standby device 204 can start operating as a new conductor device (i.e., conductor device 204). On the other hand, conductor device 202 can also determine that standby device 204 has become unavailable. In this way, conductor devices 202 and 204 may detect the split in virtual switch 220. Upon detecting the split, conductor devices 202 and 204 can determine which segment of virtual switch 220 is to operate as the active segment that is to forward traffic associated with stack MAC address 240.

To determine the active segment, each of conductor devices 202 and 204 can determine the port states of ports 232 and 234, respectively. Based on the blocked state of port 234, conductor device 204 can determine that it is the new and duplicate conductor device. Accordingly, conductor device 204 can deactivate segment 254 into a suspended state by turning off communication via a respective port of segment 254. On the other hand, conductor device 202 can determine that port 232 is allocated with a forwarding state. Based on the forwarding state of port 232, conductor device 202 can continue to operate segment 252. Therefore, conductor device 202 can receive traffic destined to stack MAC address 240. Because stack MAC address 240 is not used by segment 254, external devices 222, 224, and 226 may not observe any movement of stack MAC address 240.

Figure 2B:
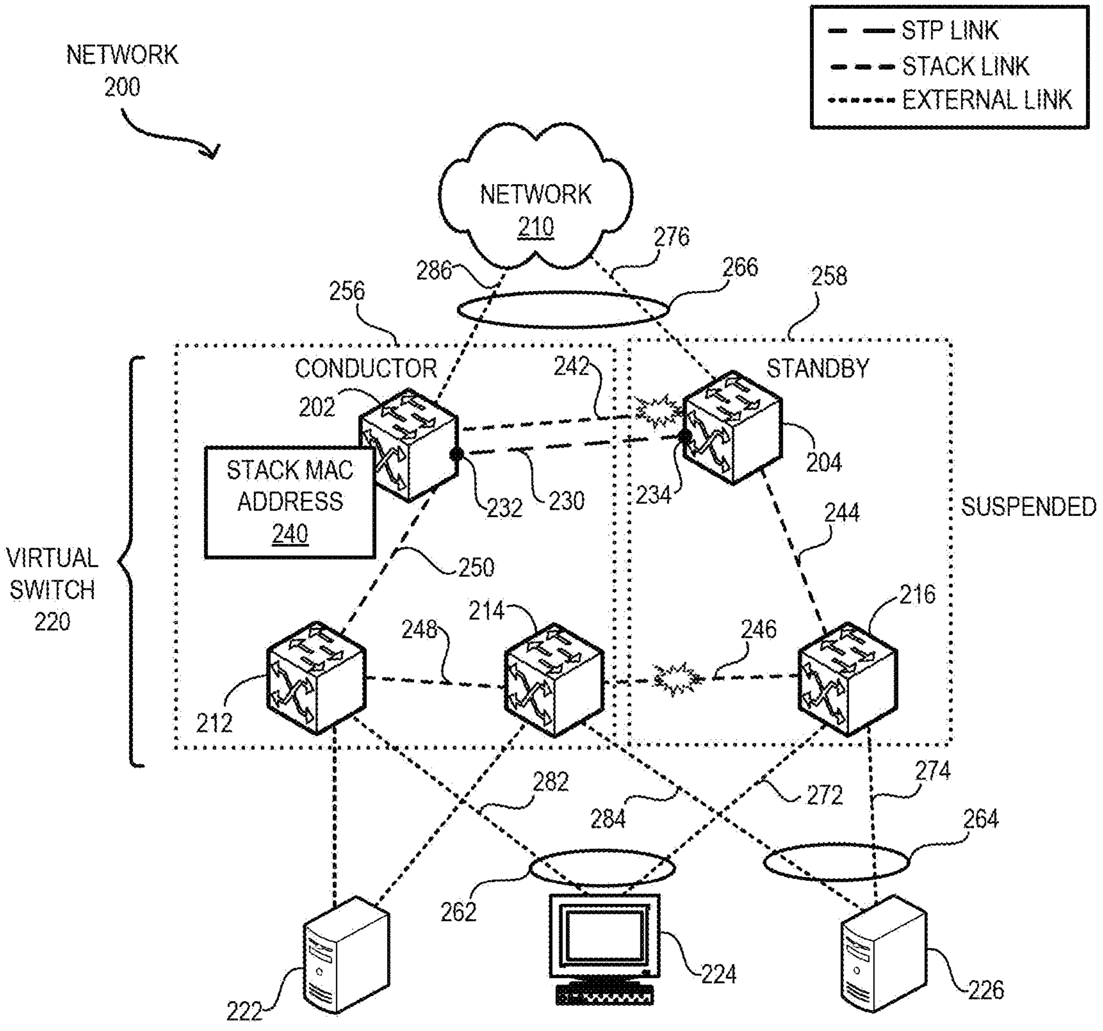
FIG. 2B illustrates an example of efficient multi-device split management in a virtual switch, in accordance with an aspect of the present application.

FIG. 2B illustrates an example of efficient multi-device split management in a virtual switch, in accordance with an aspect of the present application. Suppose that links 242 and 246 become unavailable (e.g., due to link failures). Consequently, standby device 204 and member device 216 become disconnected from conductor device 202. Under such circumstances, virtual switch 220 can be split into segments 256 and 258. Segment 256 can include conductor device 202 and member devices 212 and 214. On the other hand, segment 258 can include standby device 204 and member device 216. Standby device 204 can then start operating as a new conductor device (i.e., conductor device 204) and start managing the unified control plane of standby device 204 and member device 216.

Upon detecting the split, conductor device 204 can check the state of port 234. Based on the blocked state of port 234, conductor device 204 can deactivate segment 258 into a suspended state by turning off communication via a respective port of segment 258. Since conductor device 204 can control member device 216, conductor device 204 can suspend the ports of both conductor device 204 and member device 216. As a result, link 272 between external device 224 and member device 216 can become disabled. In the same way, link 274 between external device 226 and member device 216, and link 276 between standby device 204 and external network 210 can become disabled. Consequently, segment 258 may stop receiving traffic.

However, network 210 can be coupled to virtual switch 220 via a multi-chassis link-aggregation group (MC-LAG) 266, which can include link 276 and link 286 between conductor device 202 and external network 210. Similarly, external devices 224 and 226 can be coupled to virtual switch 220 via MC-LAGs 262 and 264, respectively. MC-LAG 262 can include link 272 and link 282 between member device 212 and external device 224. Furthermore, MC-LAG 264 can include link 274 and link 284 between member device 214 and external device 226. Since an MC-LAG can provide high availability when one of its links becomes available via other link(s), MC-LAGs 262, 264, and 266 can continue to facilitate data communication between external network 210 and external devices 212, 214, and 216.

For example, even if link 276 becomes disabled, link 286 can continue to operate. Hence, segment 256 can continue to receive traffic from network 210 via link 286 and conductor device 202. Conductor device 202 can then forward traffic destined to external device 222 to member device 212, which can then forward the traffic via link 282. Moreover, conductor device 202 can forward traffic destined to external device 226 to member device 214, which can then forward the traffic via link 284. In this way, MC-LAGs 262, 264, and 266 can maintain traffic flows to external devices 212, 214, and 216 when the ports of a plurality of devices in virtual switch 220 become suspended due to the split.

Figure 3:
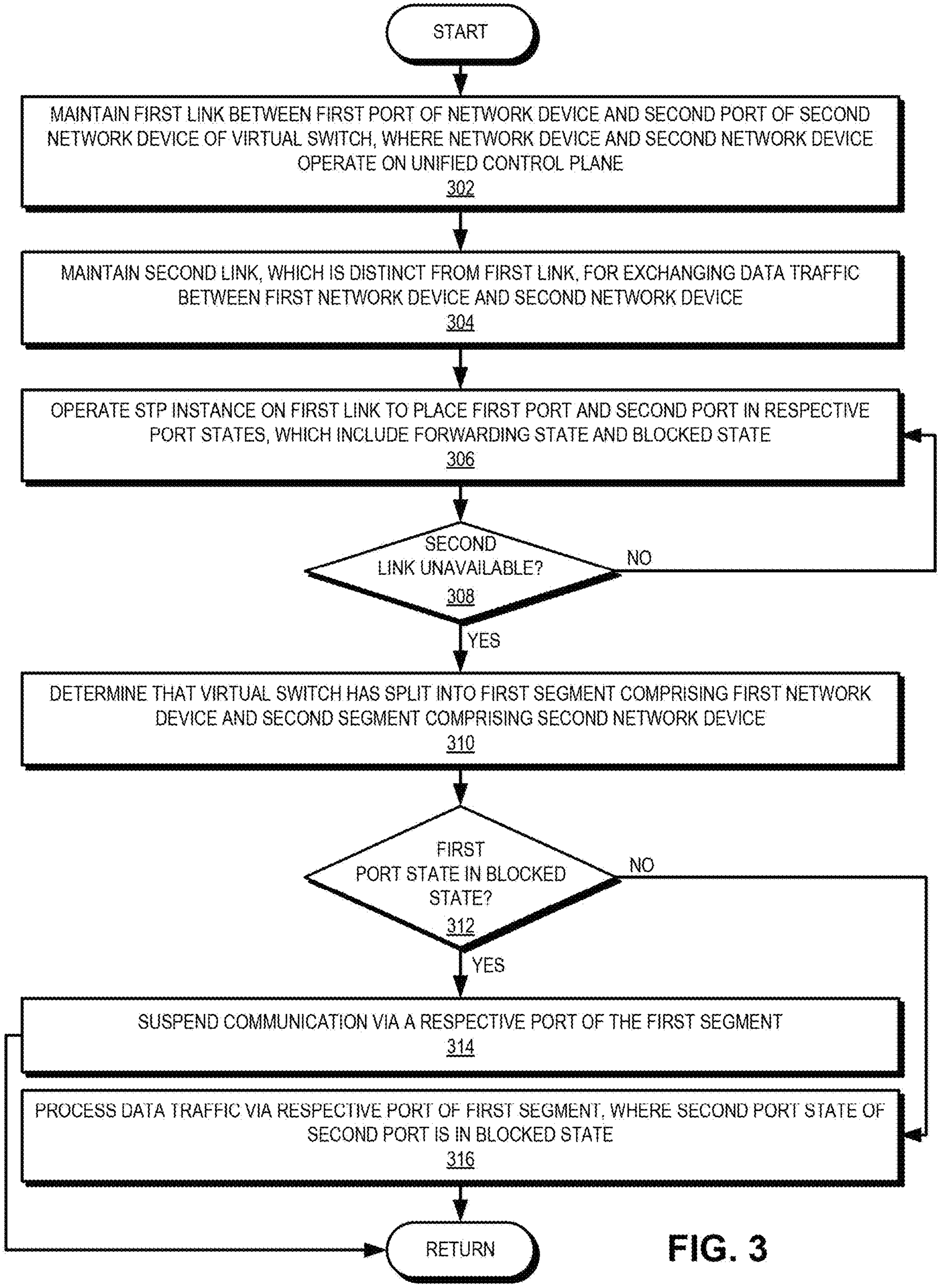
FIG. 3 presents a flowchart illustrating an example of a process of a network device in a virtual switch efficiently managing a split in the virtual switch, in accordance with an aspect of the present application.

FIG. 3 presents a flowchart illustrating an example of a process of a network device in a virtual switch efficiently managing a split in the virtual switch, in accordance with an aspect of the present application. During operation, the network device can maintain a first link between the first port of the network device and a second port of a second network device of the virtual switch, wherein the network device and the second network device can operate on a unified control plane (operation 302). Here, the virtual switch can be a VSF instance operating based on switch stacking. If the virtual switch is split into segments, the first link can be used to determine which segment of the virtual switch is to remain active and which segment of the virtual switch is to be in a suspended state. Here, communication via a respective port of the segment in the suspended state can be suspended (or turned off). The network device can also maintain a second link, which is distinct from the first link for exchanging data traffic between the first network device and the second network device (operation 304). Here, the second link can be a stack link that can carry the data traffic as well as the control plane traffic of the virtual switch. It should be noted that the first link may not carry the data traffic of the virtual switch.

The network device can then operate an STP instance on the first link (operation 306). Typically, the STP instance is operated to terminate a loop by blocking a port causing the loop. Accordingly, the STP instance can place the first port and the second port in respective port states, which can include a forwarding state and a blocked state. In some examples, the port on the conductor device of the virtual switch can be allocated a higher priority value than that of the standby device. Based on the priority value, the STP instance can allocate the forwarding state to the port on the conductor device. For example, if the network device is the conductor device, the first port can be allocated a higher priority value than the second port. Based on the priority value, the STP instance can place the first port in the forwarding state. Subsequently, the network device can determine whether the second link is unavailable (operation 308). The unavailability of the second link may cause the second device to be disconnected from the first device, which can lead to a split of the virtual switch.

Accordingly, if the second link is unavailable, the network device can determine that the virtual switch has split into a first segment comprising the first network device and a second segment comprising the second network device (operation 310). In other words, the first and second network devices can become disconnected from each other and can be in two separate segments (e.g., segments 252 and 254 in FIG. 2A). The network device can then determine whether the first port state of the first port is in a blocked state (operation 312). The first port state, which can be a forwarding state or a blocked state, can be allocated by the STP instance. If the first port state is in a blocked state, the network device can be the standby device of the virtual switch. When the virtual switch is split, the network device can start operating as a conductor device.

If the first port state is in the blocked state, the network device can determine that it is a duplicate conductor device. Hence, the network device can suspend communication via a respective port of the first segment (e.g., segment 254 of FIG. 2A) (operation 314). The suspension can prevent data traffic via the ports of the first segment. On the other hand, if the first port state is not in a blocked state (e.g., in a forwarding or down state), the network device can be the conductor device of the virtual switch. When the virtual switch is split, the network device can then continue its operations as the conductor device. The network device can then process data traffic via a respective port of the first segment (e.g., segment 252 of FIG. 2A) (operation 316). In this way, the network device can efficiently select the active segment when the virtual switch is split.

Figure 4:
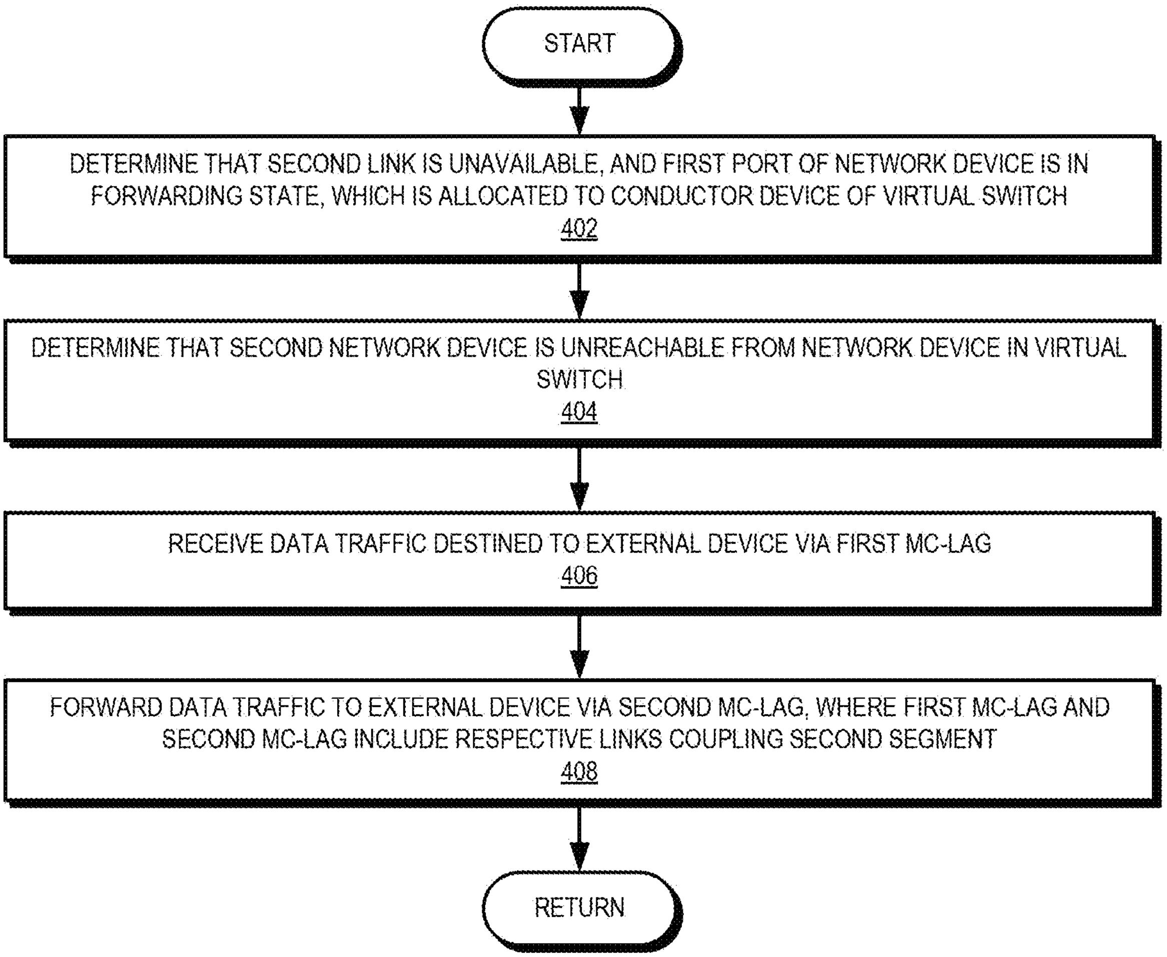
FIG. 4 presents a flowchart illustrating an example of a process of a network device in a split virtual switch forwarding data traffic, in accordance with an aspect of the present application.

FIG. 4 presents a flowchart illustrating an example of a process of a network device in a split virtual switch forwarding data traffic, in accordance with an aspect of the present application. During operation, the network device, which is in the split virtual switch, can determine that the second link is unavailable, and the first port of the network device is in a forwarding state, as described in conjunction with operation 302 of FIG. 3 (operation 402). The forwarding state can be allocated to the conductor device of the virtual switch (e.g., based on a priority value allocated to the first port). The network device can also determine that the second network device is unreachable from the network device in the virtual switch (operation 404). The second network device can be unreachable from the network device if all data links (e.g., stack links 142 and 144 in FIG. 1) between the network device and the second network device are unavailable.

Since the network device is the conductor device, the network device can receive data traffic destined to an external device via a first MC-LAG (operation 406). Here, the links of the first MC-LAG can be coupled to the network device and the second network device. Even if communication via the ports of the second network device is suspended, the link coupling the network device can carry traffic. Subsequently, the network device can then forward the data traffic to the external device via a second MC-LAG (operation 408). In the example in FIG. 2B, conductor device 202 can receive data traffic destined to external device 226 via MC-LAG 266 (e.g., the first MC-LAG). Upon receiving the data traffic, conductor device 202 can forward the data traffic via MC-LAG 264 (e.g., the second MC-LAG).

Figure 5:
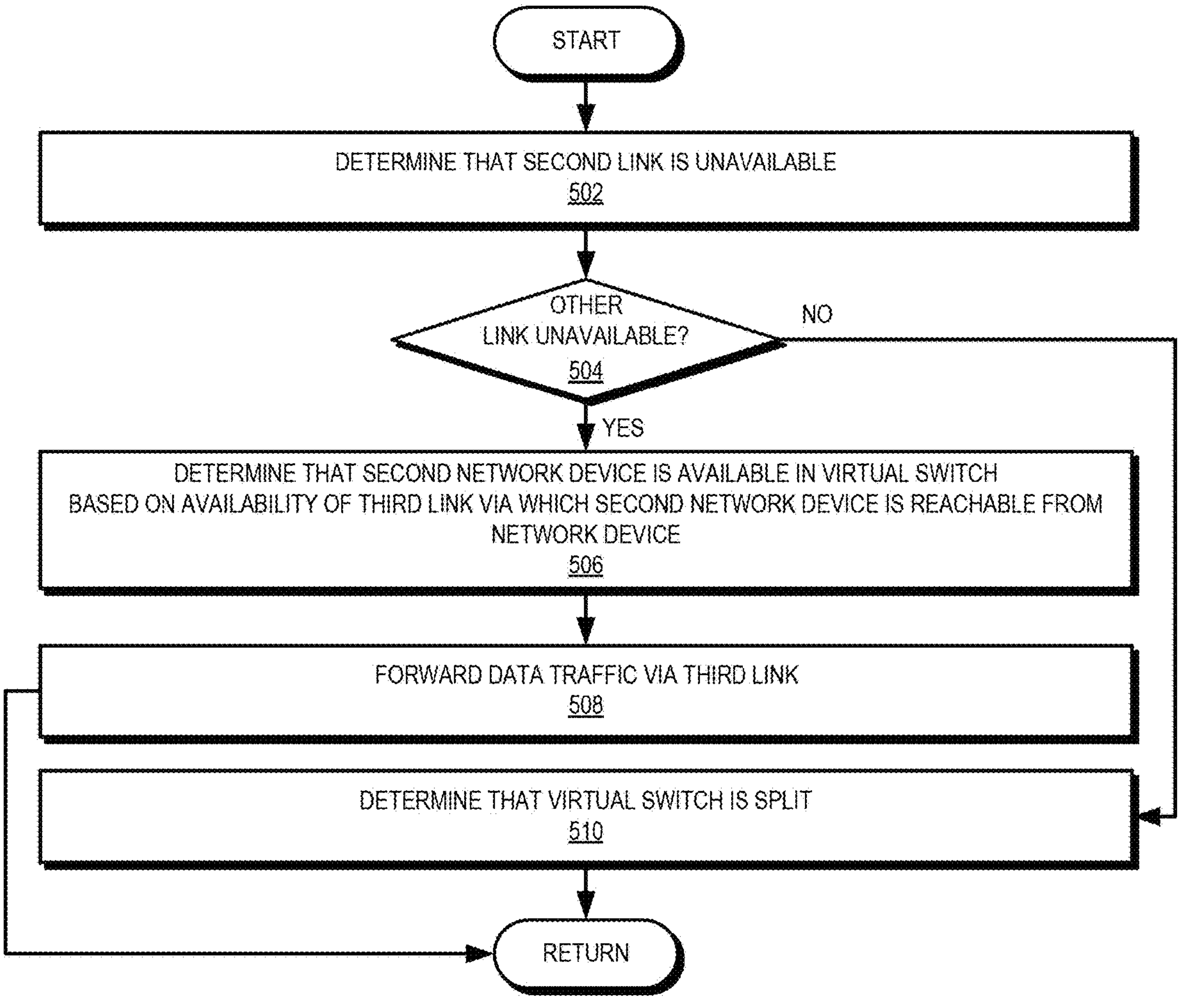
FIG. 5 presents a flowchart illustrating an example of a process of a network device in a virtual switch with an unavailable link forwarding data traffic, in accordance with an aspect of the present application.

FIG. 5 presents a flowchart illustrating an example of a process of a network device in a virtual switch with an unavailable link forwarding data traffic, in accordance with an aspect of the present application. During operation, the network device, which is in the virtual switch, can determine that the second link is unavailable, as described in conjunction with FIG. 3 (operation 502). The virtual switch can be split if the second network device is unreachable from the network device via any link in the virtual switch. Therefore, the network device can determine whether there is any other link available via which the second network device can be reachable (operation 504). In the example in FIG. 1, standby device 104 can be unreachable from conductor device 102 if link 142 (e.g., the second link) and link 144 (or link 146, 148, and 150) are unavailable. Under such circumstances, virtual switch 120 is split. Accordingly, if no other link is available, the network device can determine that the virtual switch is split (operation 510).

On the other hand, if at least one other link, such as a third link is available, the network device can determine that the second network device is available in the virtual switch based on the availability of the third link via which the second network device is reachable from the network device (operation 506). For example, if conductor device 102 of FIG. 1 determines that standby device 104 is reachable via link 144 (e.g., the third link), conductor device 102 can determine that standby device 104 is available in virtual switch 120. The network device can then forward data traffic via the third link (operation 508). Here, the data traffic can be destined to external devices reachable via the second network device.

Figure 6:
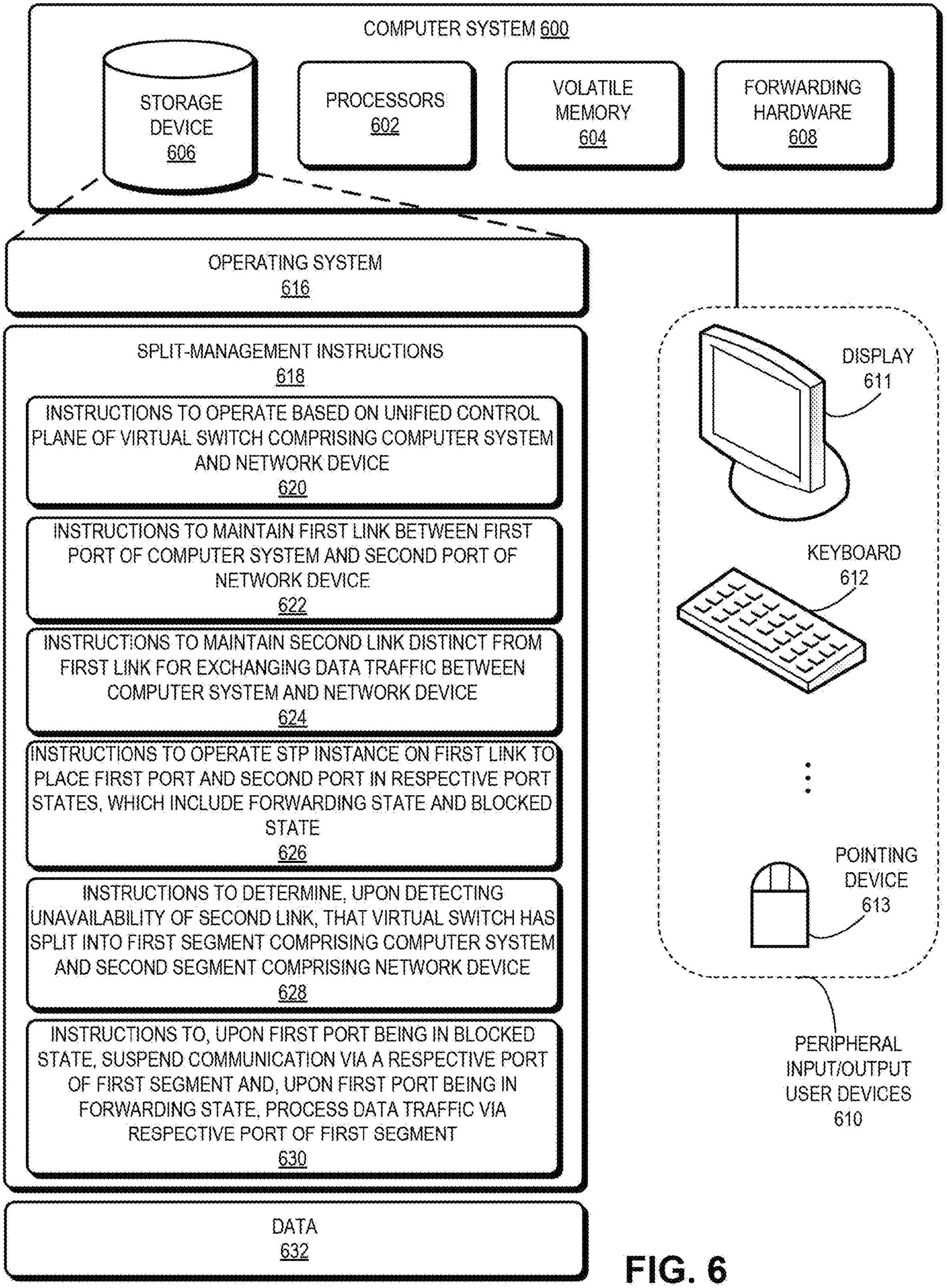
FIG. 6 illustrates an example of a computing system facilitating efficient split management in a virtual switch, in accordance with an aspect of the present application.

FIG. 6 illustrates an example of a computing system facilitating efficient split management in a virtual switch, in accordance with an aspect of the present application. Computer system 600 includes one or more processors 602, a memory 604, and a storage device 606. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Storage device 606 includes a non-transitory computer-readable storage medium and stores an operating system 616, split-management instructions 618, and data 632. Computer system 600 may include fewer or more entities or instructions than those shown in FIG. 6.

Split-management instructions 618 can include instructions, which when executed by computer system 600, can cause computer system 600 to perform methods and/or processes described in this disclosure. Specifically, split-management instructions 618 may include instructions 620 to operate based on a control plane of a virtual switch comprising computer system 600 and a network device. Here, computer system 600 can be a network device, such as conductor device 102 or standby device 104 of virtual switch 120 in FIG. 1.

Split-management instructions 618 may also include instructions 622 to maintain a first link between a first port of computer system 600 and a second port of the network device. An example of the first link can be link 130 between port 132 of conductor device 102 and port 134 of standby device 104 in FIG. 1. Furthermore, split-management instructions 618 may also include instructions 624 to maintain a second link distinct from the first link for exchanging data traffic between computer system 600 and the network device. An example of the second link can be link 142 between conductor device 102 and standby device 104 in FIG. 1, wherein link 142 is distinct from link 130.

Split-management instructions 618 may include instructions 626 to operate an STP instance on the first link to place the first port and the second port in respective port states, which can include forwarding state and blocked state. For example, the STP instance applied on link 130 of FIG. 1 can place ports 132 and 134 in respective port states. These port states can be forwarding and blocked states. Split-management instructions 618 may also include instructions 628 to determine, upon detecting the unavailability of the second link, that the virtual switch is split into a first segment comprising computer system 600 and a second segment comprising the network device. In the example of FIG. 2A, virtual switch 220 can be split into segment 252 (e.g., the first segment) comprising conductor device 202 and segment 254 (e.g., the second segment) comprising standby device 204.

Split-management instructions 618 may include instructions 630 to, upon the first port being in a blocked state, suspend communication via a respective port of the first segment, and upon the first port being in a forwarding state, process data traffic via a respective port of the first segment. In the example in FIG. 1, based on whether port 132 is in a forwarding state or blocked state, conductor device 102 can determine whether to suspend or continue communication. Data 632 can include any data that is required as input, or that is generated as output by the methods, operations, communications, and/or processes described in this disclosure. Specifically, data 632 can include port states associated with a port of an STP link.

Computer system 600 and split-management instructions 618 may include more instructions than those shown in FIG. 6. For example, split-management instructions 618 can also store instructions for determining the availability of another link, such as link 144 of FIG. 1; determining unreachability of standby device 204 of FIG. 2A; receiving and forwarding traffic via the MC-LAGs of FIG. 2B; the operations depicted in the flowcharts of FIGS. 3, 4, and 5; and the instructions of non-transitory CRM 700 in FIG. 7.

Figure 7:
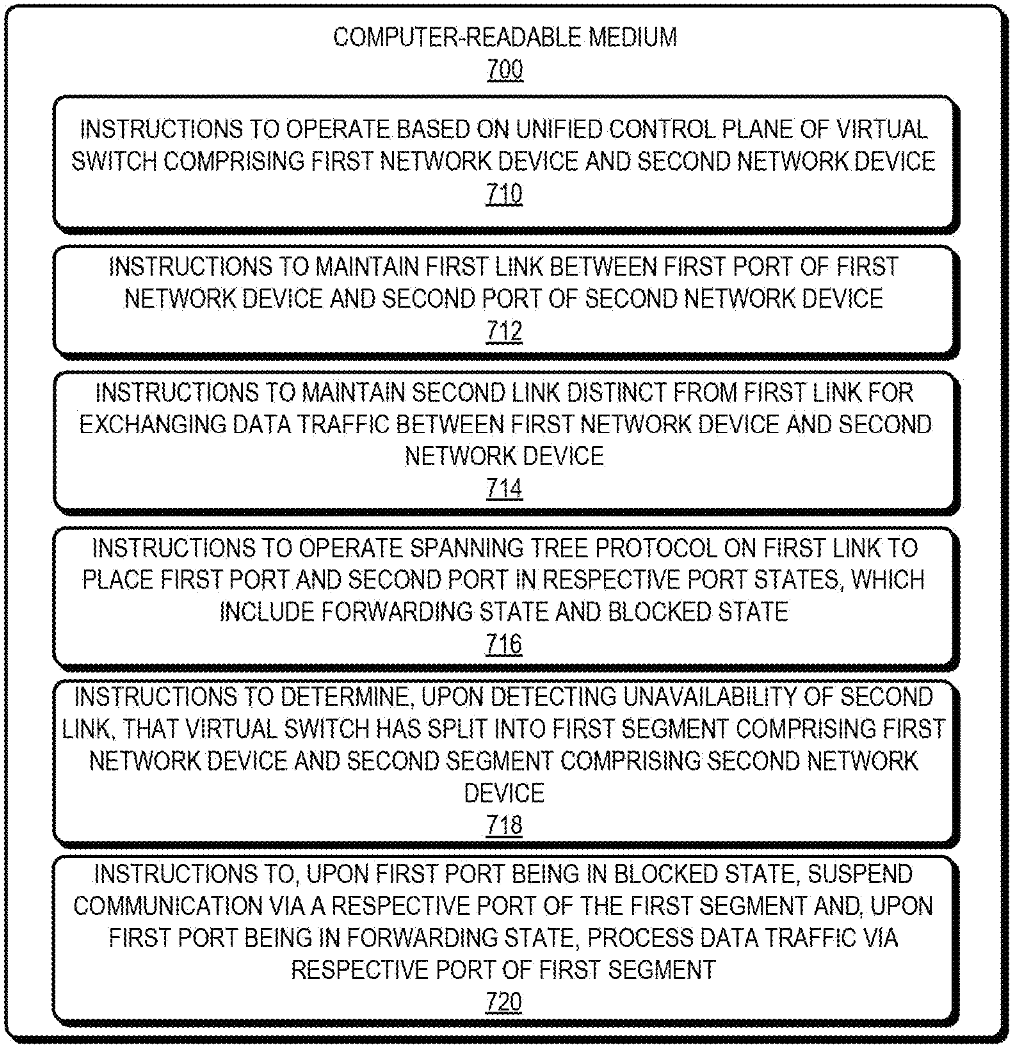
FIG. 7 illustrates an example of a computer-readable medium (CRM) facilitating efficient split management in a virtual switch, in accordance with an aspect of the present application.

FIG. 7 illustrates an example of a CRM facilitating efficient split management in a virtual switch, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to operate based on a control plane of a virtual switch comprising a first network device and a second network device, as described above in relation to conductor device 102 and standby device 104 of FIG. 1.

CRM 700 can also include instructions 712 to maintain a first link between a first port of the first network device and a second port of the second network device. An example of the first link can be link 130 between port 132 of conductor device 102 and port 134 of standby device 104 in FIG. 1. CRM 700 can include instructions 714 to maintain a second link distinct from the first link for exchanging data traffic between the first network device and the second network device. An example of the second link can be link 142 between conductor device 102 and standby device 104 in FIG. 1, wherein link 142 is distinct from link 130.

CRM 700 can additionally include instructions 716 to operate an STP instance on the first link to place the first port and the second port in respective port states, which can include forwarding state and blocked state. For example, the STP instance applied on link 130 of FIG. 1 can place ports 132 and 134 in respective states.

CRM 700 can additionally include instructions 718 to determine, upon detecting the unavailability of the second link, that the virtual switch is split into a first segment comprising computer system 600 and a second segment comprising the network device. In the example of FIG. 2A, virtual switch 220 can be split into segment 252 (e.g., the first segment) comprising conductor device 202 and segment 254 (e.g., the second segment) comprising standby device 204.

CRM 700 can additionally include instructions 720 to, upon the first port being in a blocked state, suspend communication via a respective port of the first segment, and upon the first port being in a forwarding state, process data traffic via a respective port of the first segment. In the example in FIG. 1, based on whether port 132 is in a forwarding state or blocked state, conductor device 102 can determine whether to suspend or continue communication.

CRM 700 may include more instructions than those shown in FIG. 7. For example, CRM 700 can also store instructions for determining the availability of another link, such as link 144 of FIG. 1; determining unreachability of standby device 204 of FIG. 2A; receiving and forwarding traffic via the MC-LAGs of FIG. 2B; the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a first network device of a virtual switch, which includes a second network device and operates on a unified control plane. During operation, the first network device can maintain a first link between a first port of the first network device and a second port of the second network device. Here, the first link can be distinct from a second link used for exchanging data traffic between the first and second network devices of the virtual switch. The first network device can operate a spanning tree protocol on the first link to place the first port and the second port in respective port states. The port states can include a forwarding state and a blocked state. If the second link becomes unavailable, the first network device can determine that the virtual switch has split into a first segment comprising the first network device and a second segment comprising the second network device. The first network device can then determine a first port state of the first port. If the first port state is in the blocked state, the first network device can suspend communication via a respective port of the first segment.

In a variation on this aspect, if the first port state is in the forwarding state or a down state, the first network device process traffic via a respective port of the first segment, wherein the first port state being in the down state indicates unavailability of the second network device.

In a further variation, the first network device can receive data traffic destined to an external device via a first MC-LAG and forward the received data traffic to the external device via a second MC-LAG. Here, the first MC-LAG and the second MC-LAG can include respective links coupling the second segment.

In a variation on this aspect, the first port state being in the blocked state can indicate that the first network device is a standby device of the virtual switch and the second network device is a conductor device of the virtual switch. Here, the conductor device facilitates the unified control plane of the virtual switch.

In a further variation, the communication between the virtual switch and an external device is based on a stack MAC address allocated to a respective network device of the virtual switch. Here, suspending the communication via a respective port of the first segment can prevent using the stack MAC address by the first segment.

In a further variation, operating the spanning tree protocol can include allocating the forwarding state for the conductor device and the blocked state for the standby device.

In a variation on this aspect, determining the split of the virtual switch can include determining that the second network device is unreachable from the second network device in the virtual switch.

In a further variation, the first network device can determine the availability of a third link via which the second network device is reachable from first network device. The first network device can then determine that the second network device is available in the virtual switch and forward data traffic via the third link.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
operating a virtual switch that includes a first network device and a second network device;
maintaining a first link that runs a spanning tree protocol between a first port of the first network device and a second port of the second network device;
determining that the virtual switch has split into a first segment that includes the first network device and a second segment that includes the second network device;
upon determining that the virtual switch has split, determining that the first port of the first network device has been placed in a blocked state by the spanning tree protocol; and
in response to determining that the first port of the first network device has been placed in the blocked state, suspending data traffic in connection with the first network device due at least in part to the first network device being included in the first segment.

2. The method of claim 1, further comprising, in response to determining that the second port of the second network device is in a forwarding state, processing data traffic in connection with the second network device due at least in part to the second network device being included in the second segment.

3. The method of claim 2, further comprising:
receiving data traffic destined to an external device via a first multi-chassis link aggregation group (MC-LAG); and
forwarding the received data traffic to the external device via a second MC-LAG, wherein the first MC-LAG and the second MC-LAG include respective links coupling the second segment.

4. The method of claim 1, wherein the blocked state indicates that the first network device is a standby device of the virtual switch and the second network device is a conductor device that facilitates a unified control plane of the virtual switch.

5. The method of claim 4, wherein communication between the virtual switch and an external device is based on a stack media access control (MAC) address allocated to a respective network device of the virtual switch, and wherein suspending the data traffic in connection with the first network device prevents the stack MAC address from being used by the first segment.

6. The method of claim 4, further comprising allocating, via the spanning tree protocol, a forwarding state for the conductor device and the blocked state for the standby device.

7. The method of claim 1, wherein determining that the virtual switch has split comprises determining that the first network device is unreachable from the second network device in the virtual switch.

8. The method of claim 1, further comprising:
determining that a second link that facilitates exchanging data traffic between the first network device and the second network device has become unavailable;
in response to the second link becoming unavailable:
determining availability of a third link via which the second network device is reachable from the first network device;
determining that the second network device is available in the virtual switch; and forwarding data traffic via the third link.

9. A non-transitory computer-readable storage medium storing instructions to:
operate a virtual switch that includes a first network device and a second network device;
maintain a first link that runs a spanning tree protocol between a first port of the first network device and a second port of the second network device;
determine that the virtual switch has split into a first segment that includes the first network device and a second segment that includes the second network device;
upon determining that the virtual switch has split, determine that the first port of the first network device has been placed in a blocked state by the spanning tree protocol; and
in response to determining that the first port of the first network device has been placed in the blocked state, suspend data traffic in connection with the first network device due at least in part to the first network device being included in the first segment.

10. The non-transitory computer-readable storage medium of claim 9, wherein the instructions are further to, in response to determining that the second port of the second network device is in a forwarding state, process data traffic in connection with the second network device due at least in part to the second network device being included in the second segment.

11. The non-transitory computer-readable storage medium of claim 10, wherein the instructions are further to:
receive data traffic destined to an external device via a first multi-chassis link aggregation group (MC-LAG); and
forward the received data traffic to the external device via a second MC-LAG, wherein the first MC-LAG and the second MC-LAG include respective links coupling the second segment.

12. The non-transitory computer-readable storage medium of claim 9, wherein the blocked state indicates that the first network device is a standby device of the virtual switch and the second network device is a conductor device that facilitates a unified control plane of the virtual switch.

13. The non-transitory computer-readable storage medium of claim 12, wherein communication between the virtual switch and an external device is based on a stack media access control (MAC) address allocated to a respective network device of the virtual switch, and wherein suspending the data traffic in connection with the first network device prevents the stack MAC address from being used by the first segment.

14. The non-transitory computer-readable storage medium of claim 12, wherein the instructions are further to allocate, via the spanning tree protocol, a forwarding state for the conductor device and the blocked state for the standby device.

15. The non-transitory computer-readable storage medium of claim 9, wherein determining that the virtual switch has split comprises determining that the first network device is unreachable from the second network device in the virtual switch.

16. The non-transitory computer-readable storage medium of claim 9, wherein the instructions are further to:
determine that a second link that facilitates exchanging data traffic between the first network device and the second network device has become unavailable;
in response to the second link becoming unavailable:

determine availability of a third link via which the second network device is reachable from the first network device;

determine that the second network device is available in the virtual switch; and forward data traffic via the third link.

17. A network device comprising:

one or more processing resources;

a non-transitory computer-readable storage medium storing instructions that, when executed by the one or more processing resources, cause the network device to:

operate as part of a virtual switch that includes the network device and a second network device;

maintain a first link that runs a spanning tree protocol between a first port of the network device and a second port of the second network device;

determine that the virtual switch has split into a first segment that includes the network device and a second segment that includes the second network device;

upon determining that the virtual switch has split, determine that the first port of the network device has been placed in a blocked state by the spanning tree protocol; and in response to determining that the first port of the network device has been placed in the blocked state, suspend data traffic in connection with the network device due at least in part to the network device being included in the first segment.

18. The network device of claim 17, wherein the instructions executed by the one or more processing resources further cause the network device to:

determine that a second link that facilitates exchanging data traffic between the network device and the second network device has become unavailable;

in response to the second link becoming unavailable:

determine availability of a third link via which the second network device is reachable from the network device;

determine that the second network device is available in the virtual switch; and forward data traffic via the third link.

19. The network device of claim 17, wherein the blocked state indicates that the network device is a standby device of the virtual switch and the second network device is a conductor device that facilitates a unified control plane of the virtual switch.

20. The network device of claim 19, wherein the instructions executed by the one or more processing resources further cause the network device to allocate, via the spanning tree protocol, a forwarding state for the conductor device and the blocked state for the standby device.

* * * * *